INVENTOR
PHILIP K. RICE
BY
D C Harrison
ATTORNEY

Oct. 20, 1953  P. K. RICE  2,655,796
PROCESS OF AND APPARATUS FOR SEPARATING GAS MIXTURES
CONTAINING HIGHER-BOILING IMPURITIES
Filed May 20, 1949  3 Sheets-Sheet 2

INVENTOR
PHILIP K. RICE
BY
D.C. Harrison
ATTORNEY

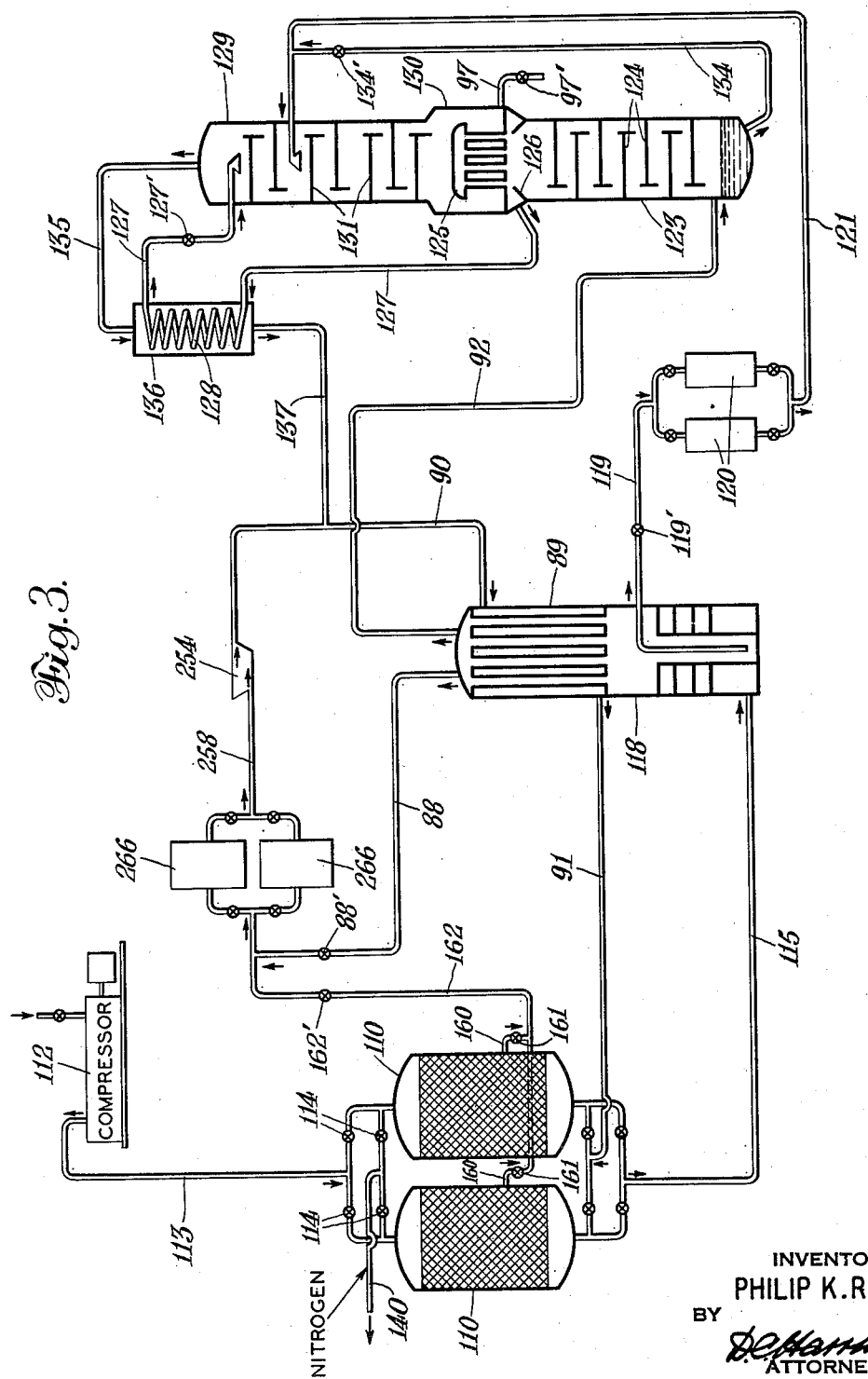

UNITED STATES PATENT OFFICE 2,655,796

PROCESS OF AND APPARATUS FOR SEPARATING GAS MIXTURES CONTAINING HIGHER-BOILING IMPURITIES

Philip K. Rice, Kenmore, N. Y., assignor, by mesne assignments, to Union Carbide and Carbon Corporation, a corporation of New York Application May 20, 1949, Serial No. 94,331

14 Claims. (Cl. 62—123)

This invention relates to a process of and apparatus for separating gas mixtures containing higher-boiling impurities, and more particularly to an improved process and apparatus for providing low temperature refrigeration when separating such gas mixtures by rectification.

Higher-boiling point impurities in gas mixtures to be separated by low-temperature rectification, such as carbon dioxide and hydrocarbons in atmospheric air to be separated into nitrogen and oxygen products, cause considerable difficulty because the impurities become solidified and deposited in cold portions of the apparatus. A preliminary treatment of the gas mixture to eliminate these impurities before the gas mixture is cooled to a low temperature is uneconomical, especially for large plants, so that many other expedients have been proposed.

When carbon dioxide is frozen out of the air in heat exchangers, it has been necessary to provide duplicate heat exchangers so that a clogged heat exchanger can be thawed while the other is in use. Such heat exchangers are a major item of equipment. Another type of heat exchanger employable when at least one of the separation products does not need to be of a high purity, is the regenerator or cold accumulator in which a large part of the carbon dioxide in a gas mixture being cooled is deposited on a heat storage mass, the deposited carbon dioxide being reevaporated during the subsequent period when the mass is cooled by outflowing separation product. Regenerators and heat exchangers, however, do not remove all the impurities, and some such expedient as washing the cooled gas mixture with a liquefied portion thereof to accumulate the impurities in a liquid from which they may be more conveniently removed is employed.

For low temperature separation, a large amount of refrigeration is required. Such refrigeration can be obtained by expansion of the gas mixture to be separated from an initially high pressure. But this requires heavy, high-pressure compressors involving high investment and operating cost. A low-pressure system, on the other hand, requires that a large amount of the compressed cooled mixture be expanded with the production of external work to provide the required refrigeration. Such expansion is not efficient unless the gas to be expanded has a temperature higher than its condensation temperature corresponding to the pressure. To avoid difficulty caused by the presence of solid carbon dioxide, it is proposed that only gas that has been washed free of impurities be expanded, but since the washing occurs at condensation temperature, the cleaned gas mixture must be reheated before it is expanded. For economic reasons, the reheating of the gas mixture is effected by heat exchange with incoming gas mixture to be cooled, and such reheating requires the use of large heat exchangers that are installed in duplicate, because the warmer gas mixture to be cooled deposits carbon dioxide in such heat exchangers. The large heat exchangers add unduly to the investment cost and to the insulation heat leak losses.

A principal object of the present invention is to provide a process of and apparatus for separating a gas mixture such as air by low temperature rectification which shall have a lower investment and operating cost.

Other objects of the invention are to provide a process and apparatus of the low initial pressure type for separating gas mixtures such as air by low-temperature rectification, including the production of refrigeration by expansion with the production of external work of part of the gas mixture, which will avoid difficulties due to the presence of the higher-boiling impurities and which also: avoids the need for a duplicate heat exchanger for reheating the portion of gas mixture to be expanded; alternatively eliminates entirely a heat exchanger for reheating the portion of gas mixture to be expanded; and permits adjustment at will of the temperature of the gas mixture to be expanded for efficient refrigeration production.

These and other objects and advantages of the invention will become apparent from the following description and the accompanying drawings, in which the figures are diagrammatic views showing exemplary embodiments of apparatus for separating gas mixtures such as air and including features according to the invention. In the drawing:

Fig. 3 is a diagrammatic view of an assemblage of apparatus for separating a gas mixture such as air to produce a liquid oxygen product, and including another embodiment of the invention.

Figure 1:
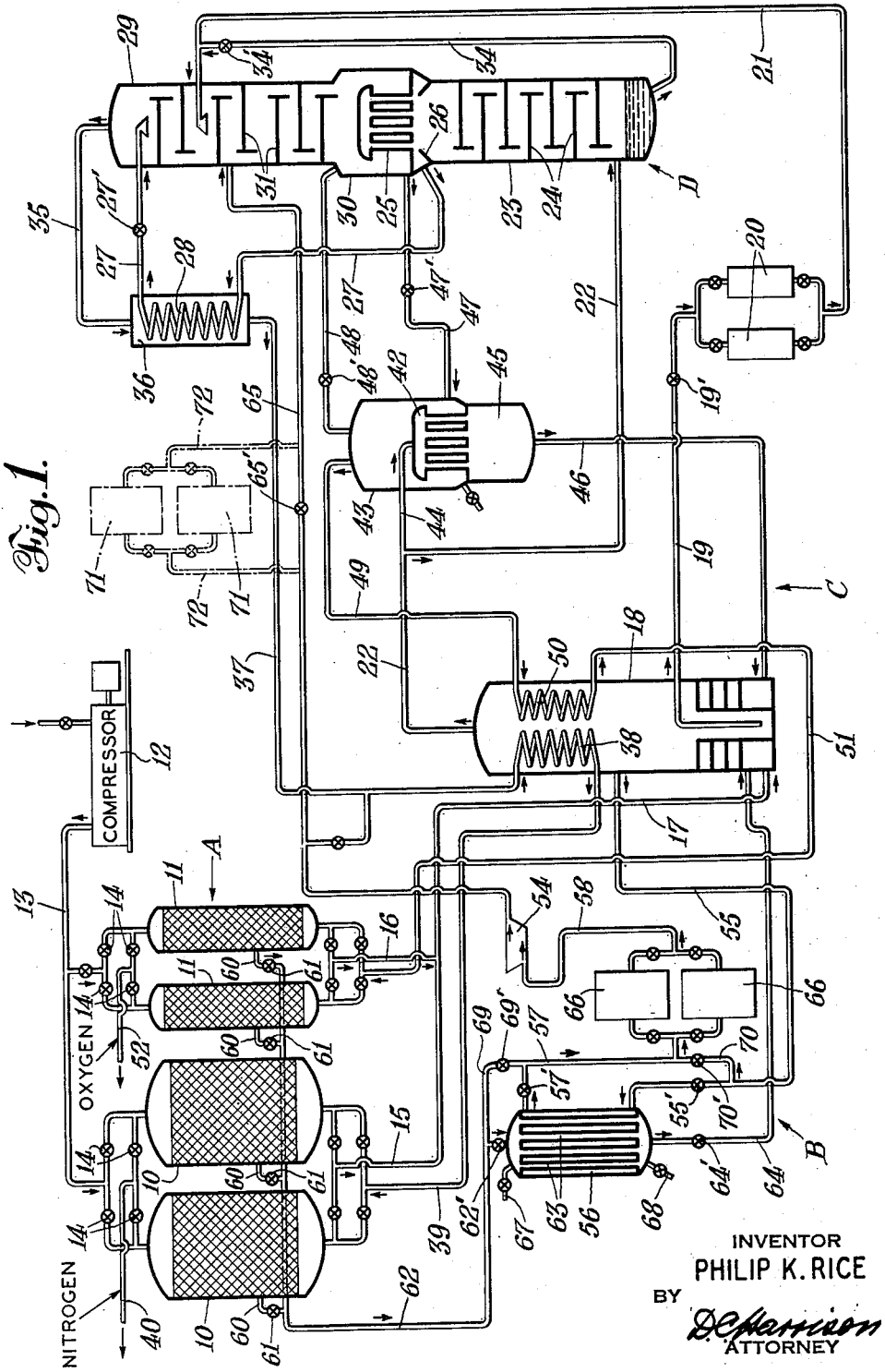
Fig. 1 is a diagrammatic view of a representative assemblage of apparatus for separating a gas mixture such as air, including one embodiment of the invention.

Referring now to the drawing, and particularly to Fig. 1 in which the apparatus illustrated is particularly suited for the large-volume production of gaseous oxygen separated from air, the main elements of apparatus comprise a main heat exchange system A, a refrigeration-producing means B, an impurity clean-up system C, and a rectifying apparatus D. The main heat exchange system A may be of the countercurrent type, or of the countercurrent type employing interchangeable flow passages, or as shown, the cold accumulator or regenerator type. When the oxygen product is to be recovered at highest possible purity it is necessary to employ heat exchangers of the countercurrent type for the outgoing oxygen product in which the outgoing oxygen product always flows through the same passages. When the product purity is such that some dilution with incoming air is permissible, regenerators can be employed, hence the heat exchange system A includes a pair of reversible regenerators 10 for effecting a heat exchange between a larger portion of the air and the outflowing nitrogen product, and a pair of regenerators 11 for effecting heat exchange between a smaller part of the air and the outgoing oxygen product. The air is preferably compressed by a rotary compressor 12 to a pressure preferably less than 100 p. s. i. Such air, if desired, may be cooled enough to remove heat of compression and is then conducted by a conduit 13 to the warm ends of the regenerators 10 and 11. The regenerators are equipped with suitable cross connections having reversing valves 14 to direct the inflowing air to one regenerator while outgoing product passes through the other regenerator of a pair.

From the cold ends of the regenerators 10 and 11 respectively branch conduits 15 and 16 are connected to a conduit 17 which conducts the cold air, from which a large portion of the carbon dioxide has been removed, to the impurity clean-up system C, specifically the lower part of a scrubber chamber 18. The scrubber chamber 18 contains some liquid air which thoroughly scrubs the incoming air and retains the solid and dissolved impurities including residual carbon dioxide in the scrubber liquid. Such scrubber liquid is withdrawn through a conduit 19 for impurity removal treatment in devices represented by filters 20 after passage through an expansion valve 19'. After passage through the filters 20, the clean scrubber liquid is conducted by a conduit 21 to the rectifying apparatus D. The clean air at condensation temperature is conducted from the top of the scrubber chamber 18 through a conduit 22 to the high pressure chamber 23 of the rectifying device D. For scrubber liquid filtering there may be used a ceramic filter element such as described, for example, in U. S. Patent No. 2,337,474 of H. C. Kornemann and E. F. Yendall, and if it is desired to also remove dissolved impurities, an adsorbent device may be employed.

The rectifying device D includes the high pressure chamber 23, which, if desired, may be a rectifying column having customary gas and liquid contact devices such as trays 24 therein. The chamber 23 is closed at the top by a main condenser 25 that condenses nitrogen-rich vapor at the top of the chamber 23. Part of such condensate collects on a shelf 26 at the upper end of the chamber 23 and is transferred by a conduit 27 through a heat exchange coil 28 therein to the upper end of the main or low-pressure rectifying column 29. The column 29 communicates at its lower end with a chamber 30 surrounding the main condenser 25, and is also provided with trays 31. The liquid nitrogen transfer conduit 27, which has an expansion valve 27' therein, connects with the top of the column 29 while the conduit 21 enters at an intermediate point of the column 29. A second transfer conduit 34 provided with an expansion valve 34' conducts liquid from the bottom of the high-pressure chamber 23 to an intermediate point of the column 29. The effluent nitrogen product leaves the upper end of the column 29 through a conduit 35 to a heat exchange passage 36 surrounding the coil 28, and a conduit 37 conducts the effluent nitrogen from the heat exchange passage 36 to a heat exchange coil 38 disposed within the upper part of the scrubber chamber 18. From coil 38 the partly-warmed effluent nitrogen is conducted by a conduit 39 to the cold ends of the regenerators 10, from the warm ends of which a conduit 40 discharges the product nitrogen to the atmosphere.

The heat exchange coil 38 effects condensation of some of the scrubbed air to make a portion of scrubber liquid. Additional scrubber liquid is made by a condenser 42 disposed within an evaporator chamber 43. A connection 44 between the condenser 42 and the conduit 22 supplies air at condensation temperature, and the liquid collected in the chamber 45 below condenser 42, is conducted by gravity through a conduit 46 to the scrubber chamber 18. The oxygen product is collected in the chamber 30 and a large part of it is conducted in liquid state by a conduit 47 provided with a control valve 47' to the evaporator chamber 43 for substantially total evaporation therein. A pressure equalizing and gas withdrawal connection 48 between the upper parts of chambers 43 and 30 may also be provided. This should include a control valve 48' to regulate withdrawal of the portion of product oxygen vaporized in chamber 30. All the product oxygen is then conducted by a conduit 49 from chamber 43 to a heat exchange coil 50 also disposed within the chamber 18. From the coil 50 a conduit 51 conducts the oxygen product to the cold ends of regenerators 11, the warmed oxygen product being withdrawn from the warm ends of the regenerators 11 through a conduit 52 to a place of use.

The refrigeration-producing system B employs an expansion turbine 54 which must be supplied with air at about the compression pressure. Such air should preferably be free of carbon dioxide, and it is preferable to employ air which has passed the scrubber 18, but such air is already at its condensation temperature and must be warmed sufficiently so that the expansion with external work produces refrigeration as efficiently as possible. This clean air is withdrawn from the upper part of the scrubber chamber 18 through a conduit 55 which conducts it to one passage of a reheat heat exchanger 56. The reheated air is conducted from the warmer end of the heat exchange passage 56 through conduits 57 and 58 to the inlet of the expansion turbine 54 which preferably has a power output shaft coupled to suitable means for absorbing power, which power may be applied usefully to assist in driving the compressor 12. The heat for reheating the air to be expanded is preferably obtained by usefully cooling a portion of the incoming air. Such portion of incoming air is preferably obtained by tapping a portion of air from the regenerators through side outlets 60 which have control valves 61 therein and which all connect to a conduit 62. The conduit 62 conducts the air, which has a temperature of about −100° C., to the warm end of a heat exchange passage 63 in heat exchange relation with the passage 56 and the cold end of the passage 63 is connected by a conduit 64 to the lower end of the scrubber chamber 18. The amount of tapped-off air is proportioned to provide the desired thermal conditions in the regenerators and so that such heat exchange will heat the cleaned air to be expanded to the desired temperature, which may be about −150° C., such that after the expansion to the low pressure of the column 28 the air will be at about the condensation temperature corresponding to the low pressure. Such expanded air is conducted by a conduit 65 to an intermediate portion of the upper column 29.

The heat exchanger 56, which is a relatively large item of apparatus, would ordinarily be installed in duplicate because the tapped-off air at −100° C. contains substantially all of the carbon dioxide content and hydrocarbon impurity in that amount of the air and a large part of the carbon dioxide becomes frozen out in the heat exchange passage 63. The approximate −100° C. temperature, rather than a lower temperature, is preferred to provide the desired thermal conditions in the lower parts of the regenerators. According to the invention, only one heat exchanger need be employed because there is installed between conduits 57 and 58 a device or devices 66 for the removal of at least the solid particles of carbon dioxide. Devices 66 may be arranged in duplicate as indicated, and the piping is arranged so that the heat exchange passages 63 and 56 can be isolated so that the heat exchange passage 63 can be warmed to evaporate deposits of impurities. Thus there are provided valves 62' at the warm end connection between conduit 62 and the passage 63, a valve 64' in the conduit 64, a valve 57' at the connection between conduit 57 and the heat exchange passage 56, and a valve 55' at the connection between conduit 55 and the heat exchange passage 56. Valved connections 67 and 68 at the ends of the heat exchange passage 63 may be provided for warming and purging the heat exchange passage with a warm dry gas. While the heat exchange passage 63 is isolated, operation of the expansion turbine 54 is continued by opening a valve 69' in a by-pass connection 69 connecting between conduits 62 and 57, thus allowing the tapped-off air at −100° C. to flow directly to conduit 57 through the devices 66 to the turbine 54. Such operation may continue for a sufficient period of time to allow the heat exchange passage 63 to be cleaned, and after such cleaning the valves 62', 64', 55', and 57' may be opened and the valve 69' closed. Usually it will be desirable to reduce the temperature of the tapped-off air before expansion and this may conveniently be accomplished by directly mixing therewith a portion of colder air, sufficient for example, to cool the tapped air from −100° C. to about −150° C., through a by-pass 70 between conduit 55 and conduit 57, such by-pass 70 being provided with a control valve 70'.

The impurity removal devices 66 are indicated in diagrammatic form. If only solidified impurities are to be removed, they may comprise highly efficient filters of the type customarily employed for filtering dust particles from a stream of gas. A typical example of such a filter is one sold under the trade name "Dustex." Alternatively a device employing electrical precipitation could be employed, such as the device sold under the name "Precipitron." An ordinary filter of course can remove only particles of solid material. Since it is possible that a very minute amount of impurity can be carried along in vapor form, it is also contemplated that the devices 66 may include an adsorbent material, such as, for example, silica gel. For example, a bed of silica gel will act as a combined filter and adsorbing medium. The devices 66 are preferably installed in duplicate with suitable piping connections for isolating one of them for thawing out or regenerating the filter or adsorbent material while the other is on stream. Alternatively a single filter device 66 would be employed, particularly in the apparatus of Fig. 1, provided a by-pass around it were provided so that the device 66 may be isolated and the air flow by-passed around it when it is necessary to eliminate the deposit material therefrom. Such isolation and by-passing would take place only during the time that the cleaned air from the scrubber was being passed through the heat exchange passage 56.

Another alternative illustrated in Fig. 1 may be used if it is desired to insure against any possibility of carbon dioxide entering the upper column 29. Such alternative contemplates the insertion in conduit 65 of a pair of impurity-removing devices 71 as indicated in broken lines and having connections 72 on either side of a stop valve 65' in line 65. The devices 71 may be similar to devices 66. Use of devices 71 is usually desirable when the expanded air is fed to the column 29 because the portion of air flowing through conduits 62, 69, and 57 is at a temperature such that its carbon dioxide content is still mostly in the vapor state. The sudden cooling by admixture of some cold air through by-pass 70 effects sudden formation of some solid carbon dioxide, which is removed by the devices 66. The substantial further temperature drop occurring upon expansion of the air through the turbine 54 causes further solidification of vaporous impurities including a residual amount of carbon dioxide which may then be removed by devices 71.

Figure 2:
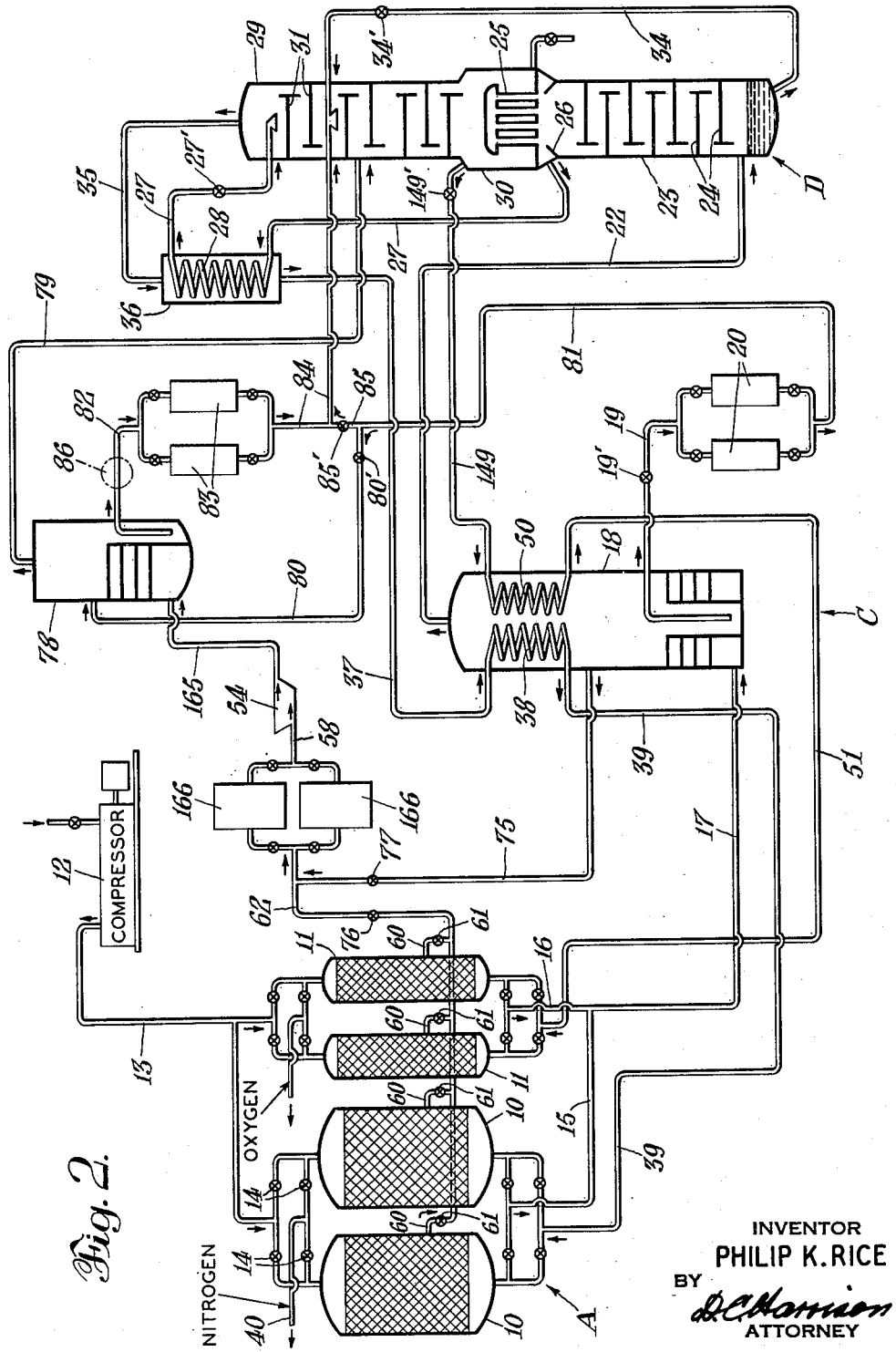
Fig. 2 is a diagrammatic view of a similar assemblage of apparatus including another embodiment of the invention.

The use of an impurity-removing device subsequent to the expander 54 becomes more important when it is desired to eliminate entirely the heat exchanger 56. Means for accomplishing this is illustrated in Fig. 2, wherein all features of apparatus similar to the features of Fig. 1 are designated by the same reference numbers. In Fig. 2, the tapped-off air from the regenerators 10 and 11 withdrawn through conduit 62 is continuously mixed with a portion of cold clean scrubbed air conducted from the scrubber 18 through a conduit 75 which joins conduit 62 before it connects with the impurity-removing devices 166. Conduits 62 and 75 have regulating valves 76 and 77 therein to adjust the flow of gases so that the temperature of the resulting mixture will be about −150° C. Such sudden cooling causes precipitation of solid carbon dioxide which is removed by the devices 166. The clean air is conducted from devices 166 through conduit 58 to the expansion turbine 54, and the expanded air is conducted by conduit 165 to an impurity-removing device which may be a device similar to that indicated at 71 in Fig. 1, or as illustrated in Fig. 2, it may be a scrubber device comprising a scrubbing chamber 78. This scrubber 78 may be similar to the main scrubber 18, the expanded air entering through conduit 165 to the lower end of the chamber 78. The air, scrubbed free of the impurities which were precipitated by the further cooling effected by the turbine 54, and also of most of the residual vapor phase impurities, is conducted from the top of the scrubber 78 through a conduit 79 to an intermediate portion of the upper column 29.

The scrubber 78 requires a supply of scrubber liquid which could be provided by liquefaction of a portion of the scrubbed air. However, a convenient source of scrubber liquid is obtainable by transfer of a portion of scrubber liquid from the main scrubber 18 to the scrubber 78 since a substantial pressure difference is available for effecting such transfer. Preferably filtered scrubber liquid is supplied to the scrubber 78 by a branch conduit 80 of the conduit 81 which conducts filtered scrubber liquid from the filters 20. The scrubber liquid containing impurities is conducted by conduit 82 to an impurity-removing means here represented by a second set of filters 83 and from filters 83 through a conduit 84 to an intermediate zone of the upper column 29. A branch 85 of conduit 81 conducts a portion of the scrubber liquid from the main scrubber to the conduit 84 for discharge into the upper column 29. Branch 80 has a control valve 80' therein and branch 85 has a control valve 85' therein so that the amount of scrubber liquid passed to the scrubber 78 may be regulated. In this way the rate of flow through filters 83 may be reduced. However, if it is desired to subject all the scrubber liquid to treatment by devices 83, valve 80' will remain wide open and valve 85' closed.

If the scrubber 78 can be located high enough, gravity flow can be relied upon to move the scrubber liquid through the filters 83 and toward the column 29. Alternatively, if desired, a pump may be interposed in the conduit 82 to overcome pressure head and resistance to flow through the filters 83. Such pump is indicated symbolically in broken lines at 86. It will also be seen that in Fig. 2 the oxygen evaporator 43 of Fig. 1 has been omitted. This can be done by transferring the functions of the evaporator 43 to the main condenser 25. The product oxygen as well as the oxygen and vapor produced for rectification in the column 29 are both evaporated by the condenser 25 and the product oxygen in vapor state is withdrawn through conduit 149 provided with control valve 149' from the chamber 30 to the heat exchange coil 50. It is also contemplated that if desired the scrubber liquid for the scrubber 78 could be withdrawn from the bottom of the high-pressure chamber 23 and transferred through a valve conduit to the chamber 78. In such instance all the scrubber liquid passing the filters 20 would go direct to the upper column 29.

The improvement according to the present invention is also particularly useful in a plant for the production of liquid oxygen in which a large amount of air is expanded for the production of refrigeration. In Fig. 3, a large quantity of air is compressed by the compressor 112 to about condensation pressure, conducted by conduit 113 to the inlet of regenerators 110, and from regenerators 110 through a conduit 115 to the lower end of a scrubber 118. A substantial portion of air is tapped off the regenerators 110 by connections 160 controlled by valves 161 to a conduit 162. A substantial portion of the scrubbed air is withdrawn from the upper part of the scrubber 118 through a conduit 88 which joins conduit 162 just before its connection to impurity-removing devices 266. The proportion of air added to that from the conduit 162, which is regulated by a valve 162', is adjusted by a control valve 88' in conduit 88, so that the temperature of the mixture becomes about —150° C. and some carbon dioxide is precipitated by the sudden chilling. Such precipitated carbon dioxide is removed by the devices 266 and the cleaned air, which has a volume substantially greater than the volume of air to be rectified, is conducted by conduit 258 to the inlet of expansion turbine 254. The discharge from expansion turbine 254 is then passed to a heat exchanger 89 in the upper part of the scrubber chamber 118 by a conduit 90, and from the heat exchanger 89 a conduit 91 passes the outgoing gas material to the cold end of regenerators 110, from the warm end of which it is discharged to atmosphere through the conduit 140.

The portion of air to be rectified includes the scrubber liquid withdrawn through conduit 119, expanded through the valve 119', filtered through the filters 120, and conducted by conduit 121 to an intermediate part of the upper column 129. The vaporous portion of the air to be rectified is withdrawn from the top of the scrubber 118 through a conduit 92 to the high-pressure chamber 123 of the rectifying apparatus.

The effluent nitrogen from the upper part of the column 129, conducted through conduit 135, heat exchanger 136, and conduit 137, passes to the conduit 90, so that the effluent nitrogen passes out with the expanded air through heat exchanger 89 and conduit 91. The oxygen produced is withdrawn in the liquid state, and for this purpose there is provided an oxygen make line 97 at the lower part of chamber 130 and having a control valve 97' therein.

In this apparatus the elimination of turbine air reheat coils is a major saving because of the large quantity of air that needs to be expanded to provide the extra refrigeration corresponding to that removed with the oxygen product in the liquid state. An impurity-removing device in the conduit 90 after the expander is not needed because the expanded air need not be sent through the rectifying column.

What is claimed is:

1. A process for the low-temperature separation of a gas mixture containing higher-boiling impurities which comprises providing a first stream of the mixture at a condensation pressure below 125 p. s. i., freed of moisture, and cooled to a low temperature; cleaning such stream of residual impurities; providing a second stream of the mixture at said pressure, free of moisture, and cooled to a higher temperature desired for work expansion such that it contains some of the impurities in solid phase; removing impurities from said second stream at said higher temperature; expanding the second stream with production of external work to a low pressure; rectifying the cleaned first stream to produce higher and lower boiling separation products; and effecting heat exchanges for using at least part of the refrigeration of said work expansion and of at least the lower-boiling product to effect liquefaction of a portion of the cleaned first stream and the balance of the refrigeration for cooling incoming gas mixture.

2. A process for the low-temperature separation of a gas mixture according to claim 1 in which said removal of impurity from the second stream includes filtration of solid particles and adsorption of vapor state impurity.

3. A process for the low-temperature separation of a gas mixture according to claim 1 in which said removal of impurity from the second stream includes filtration of the solid particles and which includes the step of cleaning residual impurities from the second stream after said expansion at the low temperature resulting from the expansion.

4. A process for the low-temperature separation of a gas mixture containing higher-boiling impurities which comprises providing a first stream of the mixture at a condensation pressure below 125 p. s. i., freed of moisture, and cooled to a low temperature; cleaning such stream of residual impurities; providing a second stream of the mixture at said pressure, freed of moisture, and cooled to a higher temperature than is desired for work expansion such that it contains impurities; admixing a portion of the cleaned first stream with said second stream to provide a combined stream at the condensation pressure; proportioning the mixing so that the resulting temperature of the combined stream is such as to provide high efficiency of refrigeration production when work-expanded; removing at least the solid phase impurities from said combined stream; expanding the combined stream with production of external work to a low pressure; rectifying the cleaned first stream to produce higher and lower-boiling separation products; and effecting heat exchanges for using at least part of the refrigeraton of said work expansion and of a separation product to effect liquefaction of a portion of the cleaned first stream and the balance of the refrigeration for cooling incoming gas mixture.

5. A process for the low-temperature separation of a gas mixture according to claim 4 in which said removal of impurity from the combined stream includes filtration of solidified impurity and adsorption of vapor state impurity.

6. A process for the low-temperature separation of a gas mixture according to claim 4 in which said removal of impurity from the combined stream includes filtration of the solid particles and which includes the step of cleaning residual impurities from the combined stream after said expansion at the low temperature resulting from the expansion.

7. A process for the low-temperature separation of a gas mixture containing higher-boiling impurities which comprises providing a first stream of the mixture at a condensation pressure below 125 p. s. i., freed of moisture, and cooled to a low temperature; scrubbing such stream with a liquefied fraction thereof to retain impurities in the liquid; separating the impurities from such scrubber liquid; providing a second stream of the mixture at said pressure, free of moisture, and cooled to a higher temperature than is desired for work expansion such that it contains impurities; admixing a portion of the cleaned first stream with said second stream to provide a combined stream at the condensation pressure; proportioning the mixing so that the resulting temperature of the combined stream is such as to provide high efficiency of refrigeration production when work-expanded; removing at least the solid phase impurities from said combined stream; expanding the combined stream with production of external work to a low pressure; rectifying the cleaned first stream to produce higher and lower-boiling separation products; and effecting heat exchanges for using at least part of the refrigeration of said work expansion and of at least the lower-boiling product to effect liquefaction of a portion of the cleaned first stream and the balance of the refrigeration for cooling incoming gas mixture.

8. A process for the low-temperature separation of a gas mixture containing higher-boiling impurities which comprises providing a first stream of the mixture at a condensation pressure below 125 p. s. i., freed of moisture, and cooled to a low temperature; scrubbing such stream with a liquefied fraction thereof to retain impurities in the liquid; separating the impurities from such scrubber liquid; providing a second stream of the mixture at said pressure, free of moisture, and cooled to a higher temperature than is desired for work expansion such that it contains impurities; admixing a portion of the cleaned first stream with said second stream to provide a combined stream at the condensation pressure; proportioning the mixing so that the resulting temperature of the combined stream is such as to provide high efficiency of refrigeration production when work-expanded; expanding the combined stream with production of external work to a low pressure; scrubbing the expanded combined stream with a liquid fraction of the gas mixture to collect residual impurities in a second scrubber liquid; filtering the second scrubber liquid; rectifying the cleaned first stream and the filtered scrubber liquids to produce higher and lower-boiling products; passing the scrubbed expanded combined stream to a later stage of the rectification and effecting heat exchanges for using at least part of the refrigeration of said work expansion and of at least the lower-boiling product to effect liquefaction of a portion of the cleaned first stream and the balance of the refrigeration for cooling incoming gas mixture.

9. In an apparatus for separating a gas mixture containing higher-boiling impurities by low-temperature rectification including a rectifying device, means for supplying the gas mixture at about its condensation pressure, and means for cooling such mixture by heat exchange with outgoing gaseous material, the combination therewith of means for cleaning a first stream of such mixture at condensation temperature to remove impurities therefrom; means for providing a second stream of such mixture cooled only to a temperature substantially above the condensation temperature such that it contains impurities; means including a filter for removing impurities from said second stream at the higher temperature; an expansion machine connected to expand said second stream and coupled to work-absorbing means; means for passing the cleaned first stream to the rectifying device; and heat exchange means connected to employ at least a portion of the refrigeration of said second stream and of an effluent product of the rectifying device to liquefy some of the cleaned mixture.

10. In an apparatus for separating a gas mixture containing higher-boiling impurities by low-temperature rectification including a rectifying device, means for supplying the gas mixture at about its condensation pressure, and means for cooling such mixture by heat exchange with outgoing gaseous material, the combination therewith of means for cleaning a first stream of such mixture at condensation temperature to remove impurities therefrom; means for providing a second stream of such mixture at a temperature substantially above the condensation temperature; valved means for mixing a portion of the cleaned first stream with the second stream to form a combined stream; means for removing at least the solid phase impurities from such combined stream; an expansion machine coupled to work-absorbing means and connected to expand said combined stream to about the pressure of the rectifying device; means for passing the cleaned first stream to the rectifying device; and heat exchange means connected to employ at least a portion of the refrigeration of said second stream and of an effluent product of the rectifying device to liquefy some of the cleaned mixture.

11. Apparatus according to claim 10 which includes means for cleaning residual impurities from the combined stream after it leaves the expansion machine, and means for passing at least a part of the cleaned expanded combined stream to the rectifying device.

12. In an apparatus for separating a gas mixture containing higher-boiling impurities by low-temperature rectification including a rectifying device, means for supplying the gas mixture at about its condensation pressure, and cold regenerators arranged for periodic alternation to cool the gas mixture by heat exchange with heat storage mass previously cooled by outflowing low-pressure gaseous material, the combination therewith of means for cleaning a first stream of such mixture at condensation temperature to remove impurities therefrom; means for tapping off a portion of the gas mixture from an intermediate part of the regenerators to form a second stream of the mixture at a higher temperature; valved means for mixing a portion of the cleaned first stream with the second stream to form a combined stream; means for removing impurities from such combined stream; an expansion machine coupled to work-absorbing means and connected to expand said combined stream to about the pressure of the rectifying device; means for passing the cleaned first stream to the rectifying device; and heat exchange means connected to employ at least a portion of the refrigeration of said second stream and of an effluent product of the rectifying device to liquefy some of the cleaned mixture.

13. In an apparatus for separating a gas mixture containing higher-boiling impurities by low-temperature rectification including a rectifying device, means for supplying the gas mixture at about its condensation pressure, and means for cooling such mixture by heat exchange with outgoing gaseous material, the combination therewith of means for cleaning a first stream of such mixture at condensation temperature to remove impurities therefrom; means for providing a second stream of such mixture cooled only to a temperature substantially above the condensation temperature such that it contains impurities; means including a body of solid adsorbent material for removing impurities from said second stream at the higher temperature; an expansion machine connected to expand said second stream and coupled to work-absorbing means; means for passing the cleaned first stream to the rectifying device; and heat exchange means connected to employ at least a portion of the refrigeration of said second stream and of an effluent product of the rectifying device to liquefy some of the cleaned mixture.

14. In an apparatus for separating a gas mixture containing higher-boiling impurities by low-temperature rectification including a rectifying device, means for supplying the gas mixture at about its condensation pressure, and means for cooling such mixture by heat exchange with outgoing gaseous material, the combination therewith of means for cleaning a first stream of such mixture at condensation temperature to remove impurities therefrom; means for providing a second stream of such mixture cooled only to a temperature substantially above the condensation temperature such that it contains impurities; means including a filter constructed to retain solidified impurities for removing impurities from said second stream at the higher temperature; an expansion machine connected to expand said second stream and coupled to work-absorbing means; means for removing residual impurities from the second stream after it leaves the expansion machine; means for passing the cleaned first stream to the rectifying device; and heat exchange means connected to employ at least a portion of the refrigeration of said second stream and of an effluent product of the rectifying device to liquefy some of the cleaned mixture.

PHILIP K. RICE.

References Cited in the file of this patent

UNITED STATES PATENTS

| Number | Name | Date |
|---|---|---|
| 1,626,345 | Le Rouge | Apr. 26, 1927 |
| 2,048,076 | Linde | July 21, 1936 |
| 2,337,474 | Kornemann et al. | Dec. 21, 1943 |
| 2,504,051 | Scheibel | Apr. 11, 1950 |
| 2,517,134 | Rice | Aug. 1, 1950 |

FOREIGN PATENTS

| Number | Country | Date |
|---|---|---|
| 373,918 | Great Britain | 1932 |

OTHER REFERENCES

Chemical Engineering, March 1947, pages 126–134, Air Separation Principles and Technology. (Copy of publication available in Patent Office Library.)